(12) United States Patent
Teegavarapu et al.

(10) Patent No.: US 10,242,175 B2
(45) Date of Patent: Mar. 26, 2019

(54) METHOD AND SYSTEM FOR AUTHENTICATION OF A STORAGE DEVICE

(71) Applicant: SAMSUNG ELECTRONICS CO., LTD., Suwon-si, Gyeonggi-do (KR)

(72) Inventors: Pranab Kumar Teegavarapu, Bangalore (IN); Imtiaz Ahmed, Bangalore (IN)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 135 days.

(21) Appl. No.: 15/378,760

(22) Filed: Dec. 14, 2016

(65) Prior Publication Data

US 2017/0262626 A1    Sep. 14, 2017

(30) Foreign Application Priority Data

Mar. 9, 2016  (IN) .............................. 201641008278

(51) Int. Cl.
| | |
|---|---|
| *G06F 21/00* | (2013.01) |
| *G06F 21/44* | (2013.01) |
| *H04L 9/32* | (2006.01) |
| *G06F 21/60* | (2013.01) |

(52) U.S. Cl.
CPC ............ *G06F 21/44* (2013.01); *G06F 21/445* (2013.01); *G06F 21/602* (2013.01); *H04L 9/32* (2013.01)

(58) Field of Classification Search
CPC ........ G06F 21/30; G06F 21/44; G06F 21/445; G06F 21/45; G06F 21/60; G06F 21/602; G06F 21/604; G06F 21/606; G06F 21/62; G06F 21/6209; G06F 21/6218; H04L 9/32; H04L 9/3271; H04L 9/3273
See application file for complete search history.

(56) References Cited

U.S. PATENT DOCUMENTS

| | | | |
|---|---|---|---|
| 5,671,368 A | 9/1997 | Chan et al. | |
| 7,617,536 B2 | 11/2009 | Nonaka et al. | |
| 8,180,988 B2 | 5/2012 | Kwon et al. | |
| 2005/0021958 A1* | 1/2005 | Park ................. | G11B 20/00086 713/170 |
| 2009/0159666 A1* | 6/2009 | O'Brien ................. | G06F 21/43 235/380 |
| 2012/0304281 A1* | 11/2012 | Kang .................... | H04L 9/3271 726/16 |

FOREIGN PATENT DOCUMENTS

KR    10-2010-0069504 A    6/2010

\* cited by examiner

*Primary Examiner* — Edward Zee
(74) *Attorney, Agent, or Firm* — Lee & Morse P.C.

(57) ABSTRACT

A method for authenticating a storage device includes sending encrypted host device data from a host device to the storage device for a current authentication session, receiving encrypted storage device specific data and an encrypted first output string from the storage device based on the encrypted host device data sent to the storage device, and authenticating the storage device based on the encrypted storage device specific data and the encrypted first output string from the storage device.

6 Claims, 9 Drawing Sheets

METHOD AND SYSTEM FOR AUTHENTICATION OF A STORAGE DEVICE

CROSS-REFERENCE TO RELATED APPLICATION

Indian Patent Application No. 201641008278, filed on Mar. 9, 2016, and entitled, "Method and System for Authentication of A Storage Device," is incorporated by reference herein in its entirety.

BACKGROUND

1. Field

One or more embodiments described herein relate to a method and system for authentication of a storage device.

2. Description of the Related Art

Laptop computers, smart phones, tablets, wearable devices, and other electronic devices have multi-tasking functionality. Also, round the clock high speed internet access enables these devices to download and upload of large amounts of data.

To support this level of performance, additional memory space is often required. The additional memory space may be in the form of Secure Digital (SD) cards, mini SD cards, micro SD cards, Solid State Devices (SSDs), or other portable storage devices.

Because of high demand, the market for portable memory devices is very lucrative. This has attracted counterfeit manufacturers. The counterfeit devices are often of low quality and unable to fulfill advertised performance levels and memory capacity. They are also usually sold at lower prices under the brand names of legitimate manufacturers. As a result, unknowing buyers of the counterfeit devices believe that the low quality devices they purchased were actually made by legitimate manufactures. The reputations of the legitimate manufacturers greatly suffer as a result.

Various methods have been proposed to authenticate storage devices. One method involves storing software in an electronic (or host) device. This software is made by the memory device manufacturer for authenticating storage devices. One type of software sends a pre-defined read write sequence to the storage device and then analyzes the response to the pre-defined sequence from the storage device. When the storage device responds with a valid signature, the storage device is authenticated.

However, this method has many drawbacks relating to its use of a static, predefined sequence. This sequence is stored in the host device and therefore is subject to hacking. When the sequence is discovered by counterfeit manufacturers, firmware in counterfeit devices can be programmed to provide a valid signature, resulting in authentication of a fake device. Further, the predefined sequence is usually programmed into all the devices of the legitimate manufacturer through a one-time communication between the host device and storage device. This makes it easy for counterfeit manufacturers to observe, track, and crack the pre-defined sequence.

SUMMARY

In accordance with one or more embodiments, a method for authenticating a storage device includes sending, by an authentication module of a host device, an encrypted host device data to the storage device for a current authentication session; receiving, by the authentication module, an encrypted storage device specific data and an encrypted first output string from the storage device based on the encrypted host device data sent to the storage device; and authenticating, by the authentication module, the storage device based on the encrypted storage device specific data and the encrypted first output string from the storage device.

In accordance with one or more other embodiments, a host device includes an authentication module to: send an encrypted host device data to the storage device for a current authentication session; receive an encrypted storage device specific data and an encrypted first output string from the storage device based on the encrypted host device data sent to the storage device; and authenticate the storage device based on the encrypted storage device specific data and the encrypted first output string from the storage device.

In accordance with one or more other embodiments, a storage device includes an authentication module to: receive an encrypted host device data from the host device for a current authentication session; and send an encrypted storage device specific data and an encrypted output string to the host device in response to the encrypted host device data from the host device.

In accordance with one or more other embodiments, an apparatus includes a memory for storing instructions to be executed by a processor, the instructions including: first code to send dynamic information to a storage device; second code to receive information from the storage device based on the dynamic information; and third code to authenticate the storage device based on the received information, the first code to change the dynamic information for different authentication sessions of the storage device.

BRIEF DESCRIPTION OF THE DRAWINGS

Features will become apparent to those of ordinary skill in the art by describing in detail exemplary embodiments with reference to the attached drawings in which.

DETAILED DESCRIPTION

The embodiments herein provide a method and system for authenticating a storage device using a multilevel authentication mechanism. This mechanism enables the exchange of data between a host device (electronic device) and the storage device at multiple instances. The method includes utilizing a Random Seed Table (RST), provided (stored) on the host device and the storage device, for encrypting and decrypting data exchanged between the host device and the storage device. The data exchange includes encrypted host device data, encrypted storage device specific data, and encrypted output string (encrypted first output string).

Thus, the method utilizes multiple instances of encrypted data exchange that makes it difficult for a fake manufacturer to crack or identify the exchanged data and to utilize it to duplicate the storage device.

Further, even if the fake manufacturer succeeds in cracking the encrypted data exchanged for a particular authentication session, the data exchanged in every authentication session for the same storage device, as well as for different types of storage devices, varies. Thus, it becomes difficult for the fake manufacturer to identify a pattern of data exchanged and use it for false authentication.

One of many reasons variation in the data exchanged in every authentication session is usage of a storage device specific data. The storage device specific data is device unique data of the storage device. The probability of device unique data being the same for any two storage devices of same type or same memory capacity is very low.

In addition, the size of the device unique data shared with the host device through the encrypted storage device increases with memory capacity of the storage device. This makes it difficult to identify a pattern of data exchanged as the size of storage device varies. Further, the size of RST may vary with varying size amount of data exchanged between the host device and the storage device. This strengthens the authentication mechanism.

The electronic (host) device may be a mobile phone, a tablet, a personal digital assistant, a laptop, a wearable device, or any other electronic device that supports storage devices. The storage device may be, for example, a Secure Digital (SD) card, a mini SD card, a micro SD card, a Solid State Device (SSD), Universal Serial Bus (USB), Universal Flash Storage (UFS) card, or another storage device, portable or not.

Figure 1:
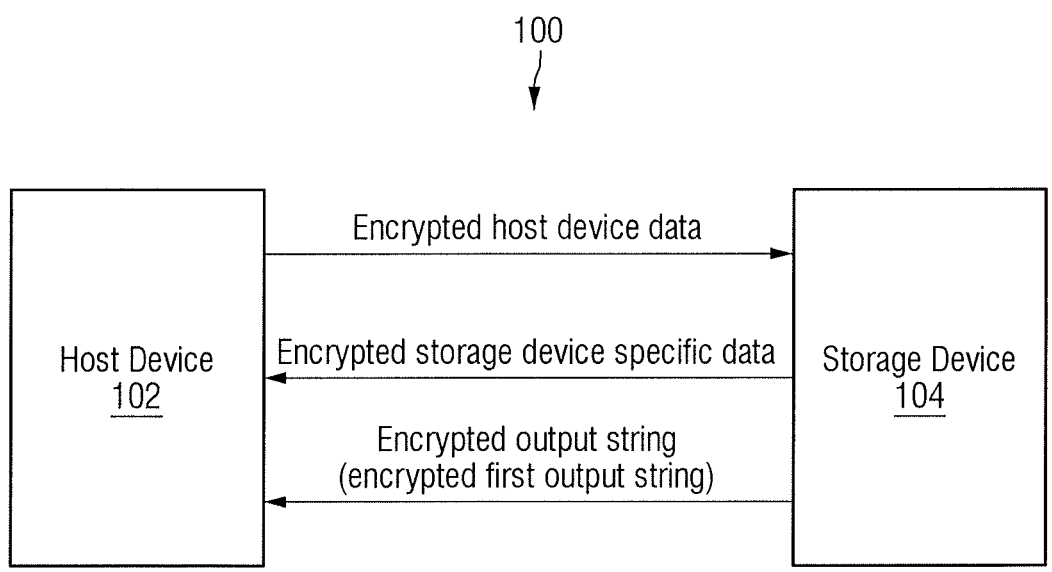
FIG. 1 illustrates an embodiment of a system for authenticating a storage device.

FIG. 1 illustrates an embodiment of a system 100 which includes a host device 102 configured to authenticate a storage device 104 using a multilevel authentication mechanism. The multilevel authentication mechanism enables encrypted data exchange between the host device 102 and the storage device 104 at multiple instances. The host device 102 and the storage device are provided with a Random seed table (RST). However, the RST is not directly provided to a host device manufacturer, but provided indirectly to the host device 102 by embedding the RST into an application binary from the device (or card) manufacturer. When executed on the host device, the application binary performs an authentication process to check authenticity of the storage device 104 connected to the host device 102.

The RST provided to the host device 102 and the storage device 104 (if the storage device 104 is an authentic storage device) by a device manufacturer may be the same. The RST maintains seeds (data entries). A seed index (index) of the RST is a pointer to the data entry (seed). In an embodiment, the RST is a buffer maintained in the host device 102 and the storage device 104 that stores the seeds.

Whenever the storage device 104 to be authenticated is connected to the host device, the host device 102 may be configured to generate the encrypted host device data (e.g., first data being exchanged). The encrypted host device data is obtained by the host device 102 by randomizing host device data. The host device data may include a random seed index, a start signature, and an end signature. Randomizing is performed using a first seed from the random seed table.

In an embodiment, the first seed of the RST to be used for encrypting the host device data may be any one seed among multiple seeds of the RST, which may be preset and known to both the host device 102 and the storage device 104. The random seed index is the seed index that points to a random seed within the RST. This random seed index may be regenerated for every authentication session. In an embodiment, an authentication application, which has access to the application binary provided by the device manufacturer, on the host device 102 may generate a random number to be used as the random seed index.

The host device 102 may be configured to send the encrypted host device data to the storage device 104. On receiving the encrypted host device data by the storage device 104, the storage device may be configured to decrypt the encrypted host device data. The storage device 104 may be configured to use the first seed of the RST (e.g., the same seed as generated by the host device 102) to decrypt the encrypted host device data and recover the host device data. The decryption provides the random seed index in the host device data that is shared by the host device 102.

Further, the storage device 104 may be configured to utilize the seed of the RST, pointed by the random seed index (also referred to as a second seed), to encrypt the device unique data of the storage device 104 to obtain the encrypted storage device specific data.

Further, in response to the received encrypted host device data, the storage device 104 may be configured to share the encrypted storage device specific data to the host device 102.

Further, the storage device 104 may be configured to generate an output string (e.g., first output string) using the device unique data. The first output string of the storage device 104 may be a function of one or more parameters of the device unique data. Once the first output string is generated, the storage device 104 may be configured to generate the encrypted first output string by randomizing the first output string using the key. The key utilized for randomization may be a seed (e.g., third seed) picked up from the RST based on a newly generated seed index. The new seed index pointing the seed (third seed) in the RST may be derived from one parameter among one or more parameters of the device unique data.

Further, the storage device 104 may be configured to send the encrypted first output string to the host device 102 for authentication of the storage device.

At the host device 102 end, when the encrypted storage device specific data is received, the host device 102 may be configured to decrypt the encrypted storage device specific data to obtain the device unique data shared by the storage device 104.

The decryption includes de-randomizing the encrypted storage device specific data using the seed from the RST (e.g., second seed). The second seed in the RST may be located using the random seed index as a pointer to the RST. The decryption of the encrypted storage device specific data enables the host device 102 to retrieve the device unique data.

The host device 102 may be configured to generate a second output string using one or more parameters of the device unique data. The parameters of the device unique data are utilized to generate the first output string and the second output string may be the same. In an embodiment, the parameters may be preset in each of the host device 102 and the storage device 104 in case the storage device 102 is the authentic storage device.

Further, the host device 102 may be configured to receive and decrypt the encrypted first output string sent by the storage device 104. The decrypting is performed by de-randomizing the received encrypted first output string using the key to get the first output string at the host device 102 end. The key used is the same key used at the storage device 104 to randomize the first output string.

Once the two strings are generated, the host device 102 may be configured to compare the first output string recovered at the host device 102 end and the second output string generated at the host device 102 end using the device unique data shared by the storage device 104. The host device 102 may be configured to authenticate the storage device 104 and treat the storage device 104 as an authentic storage device, if the two strings match exactly. However, for any mismatch detected between the first output string and the second output string, the storage device 104 may be treated as the non authentic (fake) storage device by the application binary of the device manufacturer and the same is indicated to a user.

Figure 2:
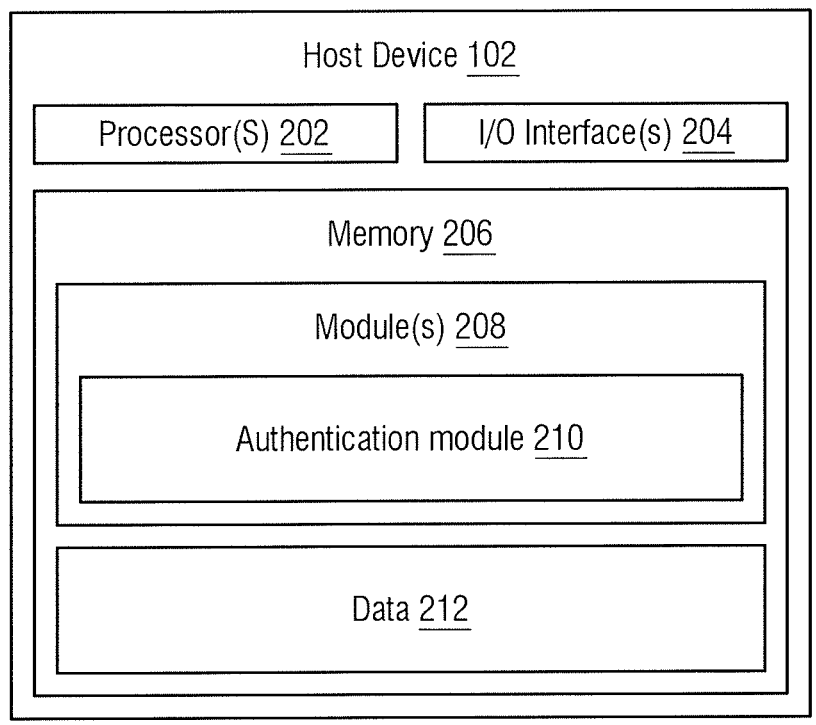
FIG. 2 illustrates an embodiment of a host device.

FIG. 2 illustrates an embodiment of a plurality of components of the host device 102. Referring to FIG. 2, the host device 102 (e.g., electronic device) may include at least one processor 202, an input/output (I/O) interface 204 (configurable user interface), a memory 206. The at least one processor 202 may be implemented as one or more microprocessors, microcomputers, microcontrollers, digital signal processors, central processing units, state machines, logic circuitry, and/or any devices that process or manipulate signals based on operational instructions. Among other capabilities, the at least one processor 202 may fetch and execute computer-readable instructions in the memory 206.

The I/O interface 204 may include a variety of software and hardware interfaces, for example, a web interface, a graphical user interface, and or another type of interface. The I/O interface 204 may allow the host device 102 to communicate with other devices such as storage device 104. The I/O interface 204 may perform multiple communications within a wide variety of networks and protocol types, including wired networks (e.g., Local Area network (LAN), cable, optical, etc.) and wireless networks (e.g., Wireless LAN, cellular, Device to Device (D2D) communication network, Wi-Fi networks, etc.).

The memory 206 includes various modules 208 that include routines, programs, objects, components, data structures, buffer space for maintaining the RST, the card/device unique data, and so on. The modules 208 perform particular tasks, functions, and/or implement particular data types.

The modules 208 may include an authentication module 210. Whenever, for a current authentication session, the storage device 104 to be authenticated is connected with the host device 102 through the I/O interface 204, the authentication module 210 may be configured to generate the encrypted host device data (e.g., first data exchanged with the storage device 102 to be authenticated).

The encrypted host device data may be obtained by the authentication module 210 by randomizing the host device data including the random seed index, the start signature and then end signature. The randomizing may be performed using the first seed from the random seed table.

In an embodiment, the seed of the RST to be used for encrypting the host device data may be preset and known both to the host device 102 and the storage device 104. The random seed index is the pointer to the random seed within the RST and is generated for the current authentication session. In an embodiment, the authentication application on the host device 102 may generate a random number to be used as the random seed index. Further, the host device 102 may be configured to send the encrypted host device data to the storage device 104.

Further, based on the encrypted host device data sent to the storage device 104, the authentication module 210 may be configured to receive the encrypted storage device specific data and the encrypted first output string from the storage device 104. Upon receiving the encrypted storage device specific data, the authentication module 210 may be configured to decrypt the encrypted storage device specific data.

The decryption provides the device unique data shared by the storage device 104. The decryption includes de-randomizing the encrypted storage device specific data using the same seed (e.g., second seed) from the RST indicated or pointed by the random seed index. The decryption of the encrypted storage device specific data enables the authentication module 210 to retrieve the device unique data.

Further, the authentication module 210 may generate the second output string using one or more parameters of the device unique data. The parameters of the device unique data to generate the first output string and the second output string may be same. In an embodiment, the parameters may be preset in each of the host device 102 and the storage device 104. A function used by the storage device 104 to generate the first output string and function used by the host device 102 to generate the second output string may be similar (e.g., only in case the storage device 102 is the authentic storage device). This enables comparison between the first output string and the second output string at the host device 102 end during authentication process.

Further, the authentication module 210 may be configured to receive and decrypt the encrypted first output string sent by the storage device 104. The decryption may be performed by de-randomizing the received encrypted first output string using the key to obtain the first output string at the host device 102 end. The key used may be the same key used at the storage device to randomize the first output string.

Once the two strings are generated, the authentication module 210 may be configured to compare the first output string recovered at the host device 102 end and the second output string generated and the host device 102 end using the may unique data shared by the storage device. The authentication module 210 may be configured to authenticate the storage device 104 as the authentic storage device if the two strings match exactly.

However, for any mismatch detected between the first output string at the host device 102 end and the second output string, the storage device 104 may be treated as a fake (or counterfeit) storage device. Thus, the user may be notified that the storage device 104 was not manufactured by the device manufacturer for whom the authentication is being performed. The user interface (e.g., a graphical user interface) may be used to display the device authenticity to the user.

The modules 208 may include programs or coded instructions that supplement applications and functions of the host device 102. The data 212, amongst other things, may serve as a repository for storing data processed, received, and generated by one or more of the modules 208. The names of the components and modules of the host device 102 are illustrative and need not be construed as a limitation.

Figure 3:
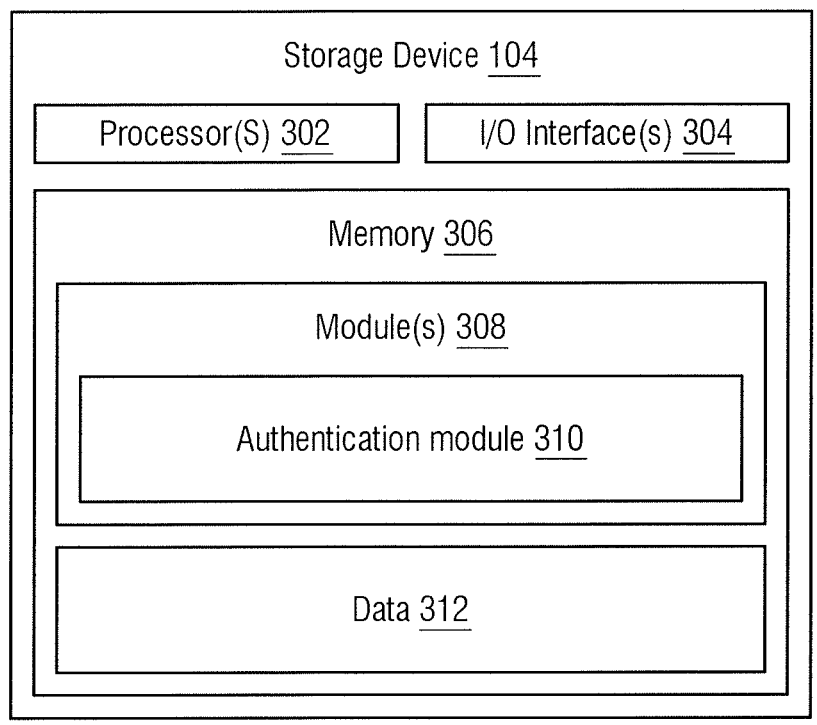
FIG. 3 illustrates an embodiment of the storage device.

FIG. 3 illustrates an embodiment of a plurality of components of the storage device 104. The storage device 104 may include at least one processor 302, an input/output (I/O) interface 304 (e.g., a configurable user interface), and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 may fetch and execute computer-readable instructions stored in the memory 306.

The I/O interface 304 may include a variety of software and hardware interfaces, for example, a web interface, a graphical user interface, a host interface logic, and the like. The host interface logic may allow the storage device 104 to communicate with other devices such as the host device 102. The memory 306 includes various modules 308 that include routines, programs, objects, components, data structures, buffer space for maintaining the RST, the device unique data, and so on, which perform particular tasks, functions or implement particular abstract data types. In one implementation, the modules 308 may include an authentication module 310. Whenever, for the current authentication session, the storage device 104 to be authenticated is connected with the host device 102 through the I/O interface 304, the authentication module 310 may be configured to receive the encrypted host device data from the host device 102.

Further, the authentication module 310 may be configured to decrypt the encrypted host device data. The authentication module 310 may be configured to use the first seed of the RST (e.g., same preset seed as that of the host device 102) on the storage device 104 to decrypt the encrypted host device data and recover the host device data.

The decryption provides the random seed index that is included in the host device data shared by the host device 102. Further, the authentication module 310 may be configured to utilize the seed (second seed) of the RST to encrypt the device unique data of the storage device 104 and obtain the encrypted storage device specific data. The second seed is located using the random seed index as the pointer to the RST.

Further, the authentication module 310 may be configured to share the encrypted storage device specific data to the host device 102 based on the received encrypted host device data. The device unique data shared with the host device 102 through the encrypted storage device specific data may increase with increase in memory capacity of the storage device 102.

Examples of how the size of the encrypted storage device specific data may increase with an increase in memory capacity will now be discussed. For a 16 GB storage device, the size of the encrypted storage device specific data exchanged may be 512 bytes. For 32 GB, the data exchanged is almost doubled, which may be 1024 bytes of encrypted storage device specific data. For 64 GB, it may be further doubled to 2048 bytes of encrypted storage device specific data that is exchanged. This indicates that any fake device manufacturer may sniff huge amounts of data such as for 16 GB, 1024*1024*4*512 bytes=2 GB of encrypted data and for 32 GB, 1024*1024*4*1024 bytes=4 GB of encrypted data. This adds to the difficulty in cracking the encrypted data exchanged since data pattern varies with size of storage device 104.

Further, the authentication module 310 may be configured to generate the output string (first output string) using the device unique data. For example, the device unique data may include information having one or more parameters such as a Card Serial Number (CSN), Bad Blocks information (BB), Remaining Valid Blocks (RemBlks), a Firmware Release Date (FwDate) and so on. These parameters are specific to a particular storage device, such as storage device 104.

The first output string of the storage device 104 is the function of one or more parameters of the device unique data. The function is a dynamic function. In an embodiment, the function for a type of storage device or a batch of storage device may be predefined and known to both the host device 102 (e.g., as information embedded within the application binary provided by the device manufacturer) and the storage device 104.

Once the first output string is generated, the authentication module 310 may be configured to generate the encrypted first output string by randomizing the first output string using the key. The key utilized for randomization is the seed (third seed) from the RST. The seed index for the third seed is derived from one parameter among one or more parameters of the device unique data. For example, the key may correspond to a seed of the RST pointed by a parameter of the device unique data such as the CSN, and key=SeedIndex (PBN(CSN)). The PBN(x) is a function providing block number on the storage device 104 where the parameter is stored. For example, PBN (CBN) provides the block number where the CBN is stored on the storage device 104.

Further, the authentication module 310 may be configured to send the encrypted first output string to the host device 102 for authentication of the storage device 104.

The modules 308 may include programs or coded instructions that supplement applications and functions of the storage device 104. The data 312, amongst other things, serves as a repository for storing data processed, received, and generated by one or more of the modules 308. The names of the components and modules of the storage device 104 are merely illustrative.

Figure 4A:
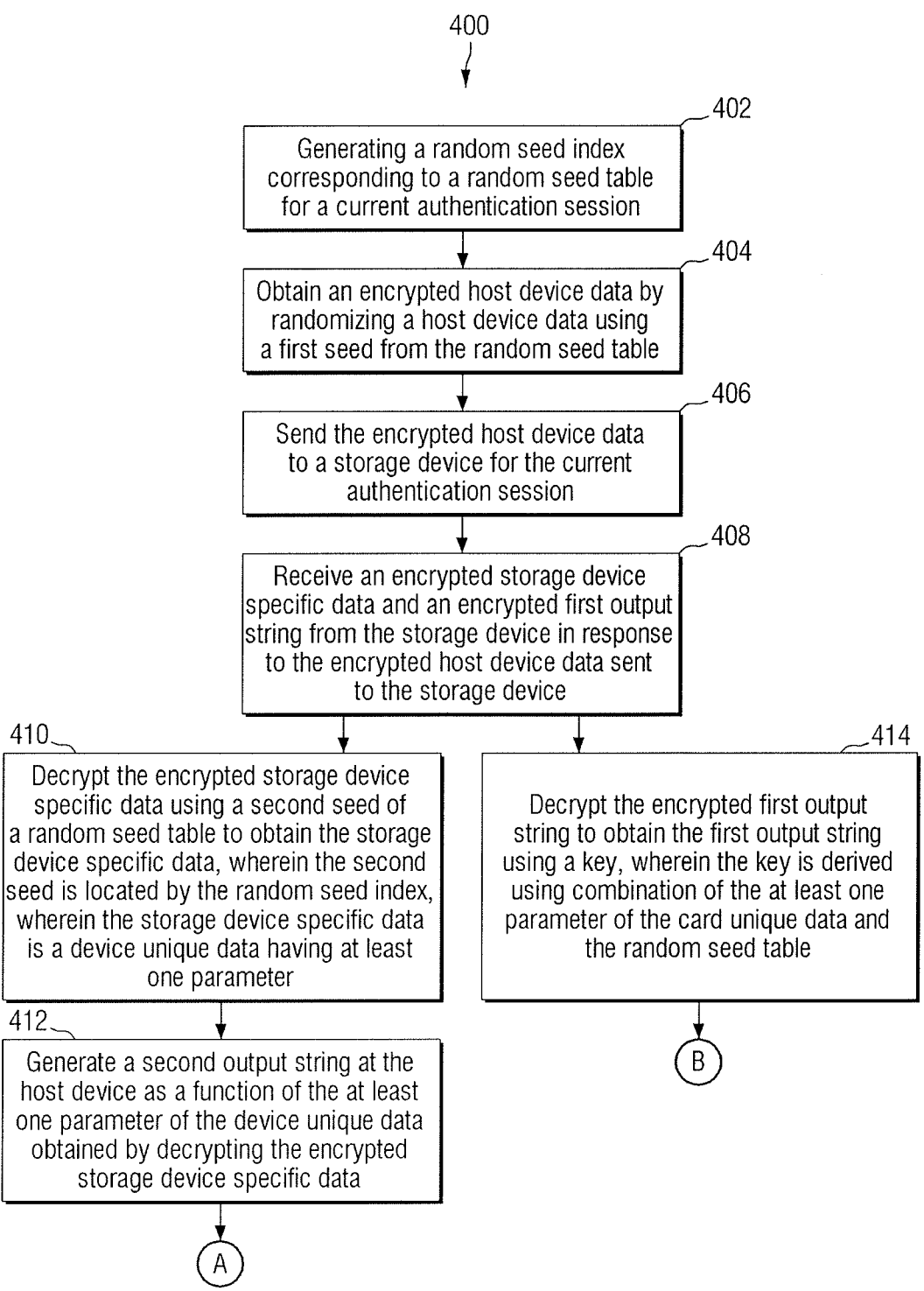
FIGS. 4A and 4B illustrate an embodiment of a method for authenticating a storage device by the host device at the host device end.
Figure 4B:
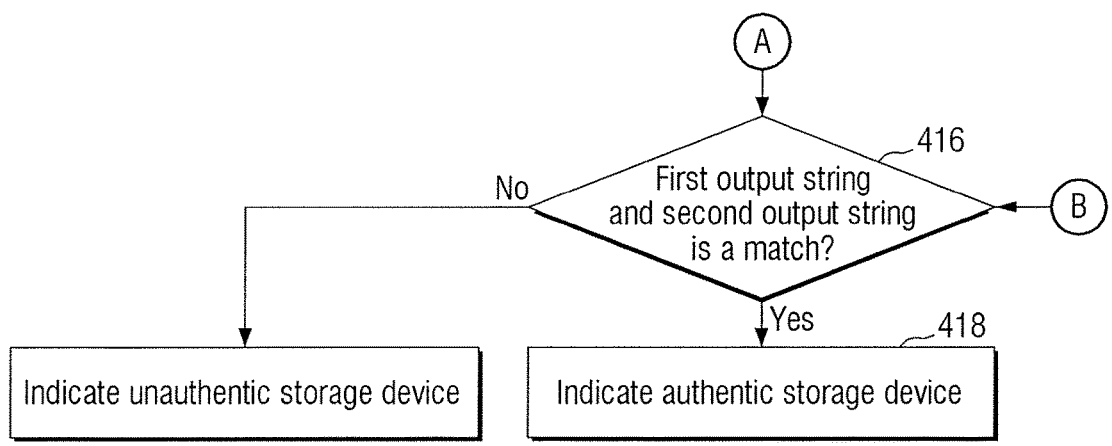

FIGS. 4A and 4B illustrate an embodiment of a method 400 for authenticating the storage device 104 by the host device 102. Whenever, for the current authentication session, the storage device 104 is connected with the host device 102 then the method includes, at operation 402, allowing the authentication module 210 to generate the random seed index for the RST for the current authentication session. At operation 404, the method 400 includes allowing the authentication module 310 to obtain the encrypted host device data by randomizing the host device data. The host device data that is randomized includes the random seed index, the start signature, and the end signature.

The randomizing my be performed using the first seed from the random seed table. In an embodiment, the seed of the RST to be used for encrypting the host device data may be preset and known both to the host device 102 and the storage device 104. The random seed index may be the pointer to the random seed within the RST. In an embodiment, the authentication application on the host device 102 may generate the random number to be used as the random seed index and the random number generated as valid only for the current authentication session. Thus, the value corresponding to the random seed index is dynamic and varies for every authentication session.

At operation 406, the method 400 allows the authentication module 210 to send the encrypted host device data to the storage device 104.

At operation 408, the method 400 allows the authentication module 210 to receive the encrypted storage device specific data and the encrypted first output string sent by the storage device 104 based on the encrypted host device data.

At operation 410 the method 400 allows the authentication module 310 to decrypt the encrypted storage device specific data using the second seed of the random seed table to obtain the storage device specific data. The second seed is located or indexed by the random seed index. The storage device specific data is the device unique data of the storage device 104. The device unique data may be information that includes, for example, one or more identifiers or parameters (e.g., CSN, BB, RemBlks, FwDate, etc.) specific to the particular storage device 104.

At operation 412, the method 400 allows the authentication module 210 to generate the second output string at the host device 102 as a function of the one or more parameters of the device unique data. The device unique data is obtained by decrypting the encrypted storage device specific data using the second seed. For example, the function may be Func(PBN(CSN),PBN (BB),RemBlks,FwDate) which is based on the parameters PBN(CSN, PBN (BB), RemBlks, FwDate. However, the function selected is not a static function but a dynamic function. Thus, the function may be different for different types of storage device defined by any parameters of the device unique data other than the parameters mentioned above. The function used by the storage device 104 to generate the first output string and the function used by the host device 102 to generate the second output string may be similar (e.g., only in case the storage device 102 is the authenticate storage device). This enables a comparison to be performed between the first output string and the second output string at the host device 102 end during authentication process.

The example function may be Func(PBN(CSN),PBN (BB),RemBlks,FwDate) for generating the second output string, which is a function of the parameters CSN, BB, RemBlks, and FwDate built using various operators such as Boolean operators and/or arithmetic operators.

At operation 414, the method 400 allows the authentication module 210 to decrypt the encrypted first output string to obtain the first output string using the key. The key is derived using combination of one or more parameters of the device unique data and the RST. For example, the key may be seed of the RST pointed by a parameter of the device unique data such as the CSN and key=(SeedIndex(PBN (CSN))). Any parameter of the device unique data may be used and preset in the host device 102 and the storage device 104.

At operation 416 the method 400 allows the authentication module 210 to compare the first output string from the storage device 104 with the second output string generated at the host device 102.

At operation 418, the method 400 allows the authentication module 210 to indicate that the storage device 104 is an authentic storage device if the two strings are identical or otherwise match. However, if the two strings do not match, then, at operation 420, the method 400 allows the authentication module 210 to indicate to the user that the storage device 104 is unauthentic storage device.

The various actions in method 400 may be performed in the order presented, in a different order, or simultaneously. Further, in some embodiments, one or more actions listed in FIGS. 4A and 4B may be omitted.

Figure 5:
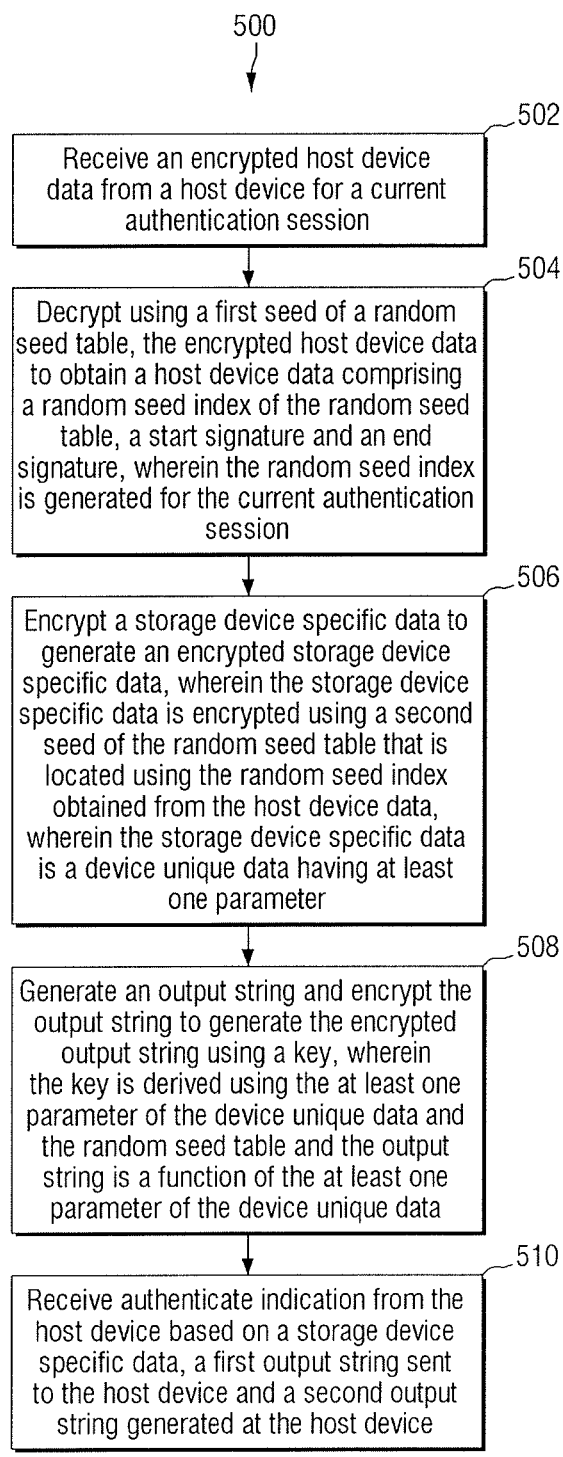
FIG. 5 illustrates another embodiment of a method for authenticating a storage device by the host device at the storage device end.

FIG. 5 illustrates an embodiment of a method 500 for authenticating the storage device 104 by the host device 102. Whenever, for the current authentication session, the storage device 104 to be authenticated is connected with the host device 102, then, at operation 502, the method 500 allows the authentication module 310 to receive the encrypted host device data from the host device 102 for the current authentication session.

At operation 504, the method 500 allows the authentication module 310 to decrypt the encrypted host device data to obtain the host device data. The encrypted host device data is decrypted using the first seed of the RST. The host device data includes the random seed index of the random seed table, the start signature, and the end signature. The random seed index is generated by the host device for the current authentication session and may be different for each authentication session.

At operation 506, the method 500 allows the authentication module 310 to encrypt the storage device specific data to generate the encrypted storage device specific data. The storage device specific data may be encrypted using the second seed of the random seed table. The second seed from the RST is indexed or located using the random seed index obtained from the host device data. The storage device specific data, which may be device unique data, includes one or more parameters. For example, the device unique data may contain information that includes one or more parameters such as CSN, BB, RemBlks, FwDate, and/or another parameter or identifier specific to the particular storage device 104.

At operation 508, the method 500 allows the authentication module 310 to generate the first output string that is function of one or more parameters or identifiers of the device unique data. For example, the function may be be Func (PBN(CSN), PBN(BB), RemBlks, FwDate) based on the parameters or identifiers CSN, BB, RemBlks, and FwDate built using various operators, e.g., as Boolean operators and/or arithmetic operators. The function is not a static function but a dynamic function, which may be different for different types of storage devices. Further, other parameters or identifiers of the device unique data may be used that define the function.

The function used by the storage device 104 to generate the first output string and the function used by the host device 102 to generate the second output string may be similar (e.g., when the storage device 104 is the authenticate storage device). This enables comparison between the first output string and the second output string at the host device 102 end during authentication process. The example function may be Func(PBN(CSN),PBN(BB),RemBlks,FwDate) for generating the second output string, which is a function of parameters or identifiers CSN, BB, RemBlks and FwDate that may use various operators, e.g., Boolean and/or arithmetic operators.

Further, the first output string is encrypted to generate the encrypted first output string using the key. The key is derived using one or more parameters or identifiers of the device unique data and the random seed table. For example, the key may be a seed of the RST pointed by a parameter of the device unique data such CSN, and key=(SeedIndex(PBN (CSN))). Any parameter or identifier of the device unique data may be used for the key. The parameter may be preset in the host device 102 and the storage device 104.

At operation 510, the method 500 allows the authentication module 310 to receive authenticate indication from the host device based on the storage device specific data and comparison between the first output string sent to the host device 102 and the second output string generated at the host device 102.

Figure 6:
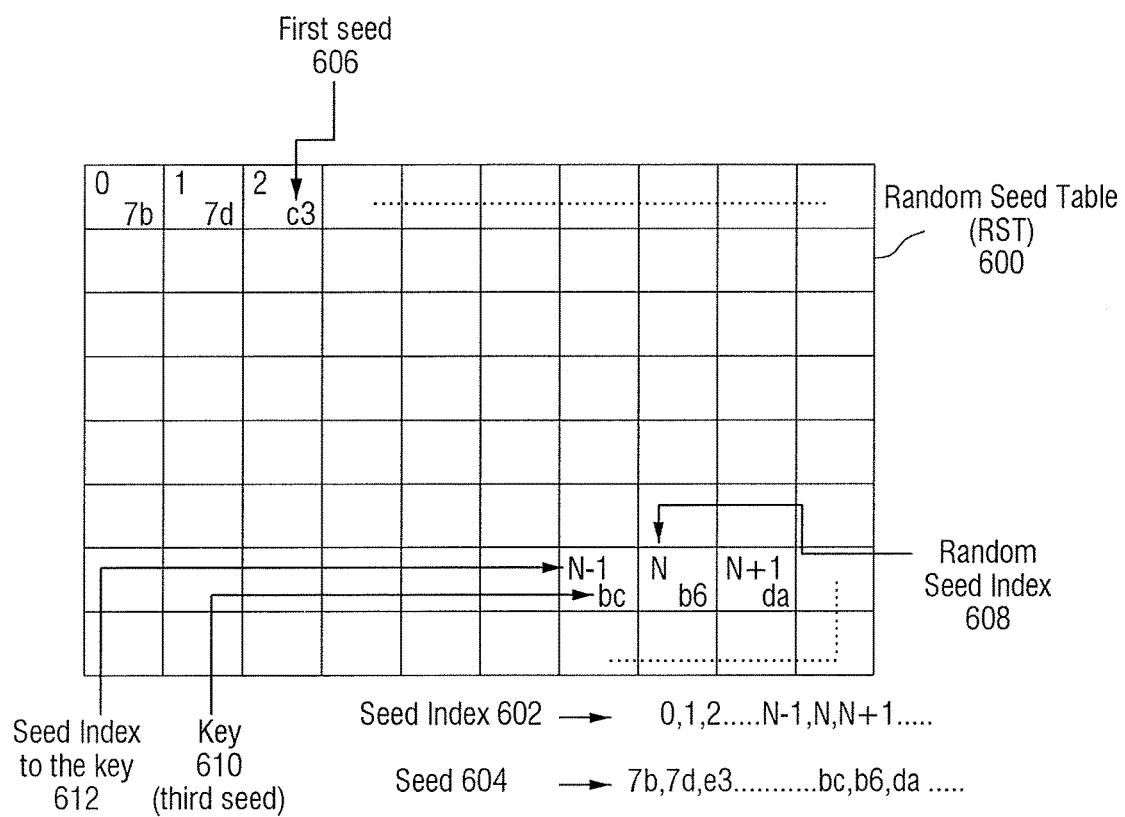
FIG. 6 illustrates an example of a Random seed table (RST)

FIG. 6 illustrates an example Random Seed Table (RST) 600 used by the host device 102 and the storage device 102 for encryption and decryption of data exchanged between the host device 102 and the storage device 104 for the authentication of the storage device 104. For example, FIG. 6 illustrates RST 600 maintained in the buffer space of memory of the host device 102 and the storage device 104 (e.g., if the storage device 102 is the authentic storage device).

The random seed table buffer locations are addressed by a pointer or a seed index 602 such as 0, 1, 2 . . . N−1, N, N+1, .... The data entries corresponding to each seed index are referred as seed of the RST 600.

The size of RST may vary. For example, the RST 600 may have 1 K Randomizer Seed entries. The amount of encrypted data exchanged between the host device 102 and the storage device 104 may be multifold, for example, if the RST size increases and further enhances authentication process.

A first seed 606 may be any seed of the RST 600 preset on both the host device 102 and the storage device 104 (e.g., an authentic storage device). In one example, the first seed is a seed 'c3' indexed or pointed by seed index 2. The seed c3 may be used by the host device 102 to encrypt the host device data by randomization. Further, the same seed c3 may be used by the storage device 104 to decrypt the encrypted host device at the storage device 104 end.

A random seed index 608 (N) may be generated by a random generator of the host device 102 and may be shared with the storage device 104 through the encrypted host device data. In one example, the seed '66' pointed or indexed by the random seed index (N) may be used by the host device 102 to decrypt the encrypted storage device specific data and obtain the device unique data. The same seed 66 may be used by the storage device 104 to encrypt the device unique data.

The RST 600 depicts a key 610 pointed or indexed by seed index 612. The key 612 may be used by the storage device 104 to encrypt the first output string and may be used by the host device to decrypt the first output string. The seed index to the key may be derived from predefined parameter from the parameters of the device unique data. For example, key=SeedIndex(PBN(CSN)) indicates seed index is a number equal to the CSN information provided by the device unique data.

Figure 7:
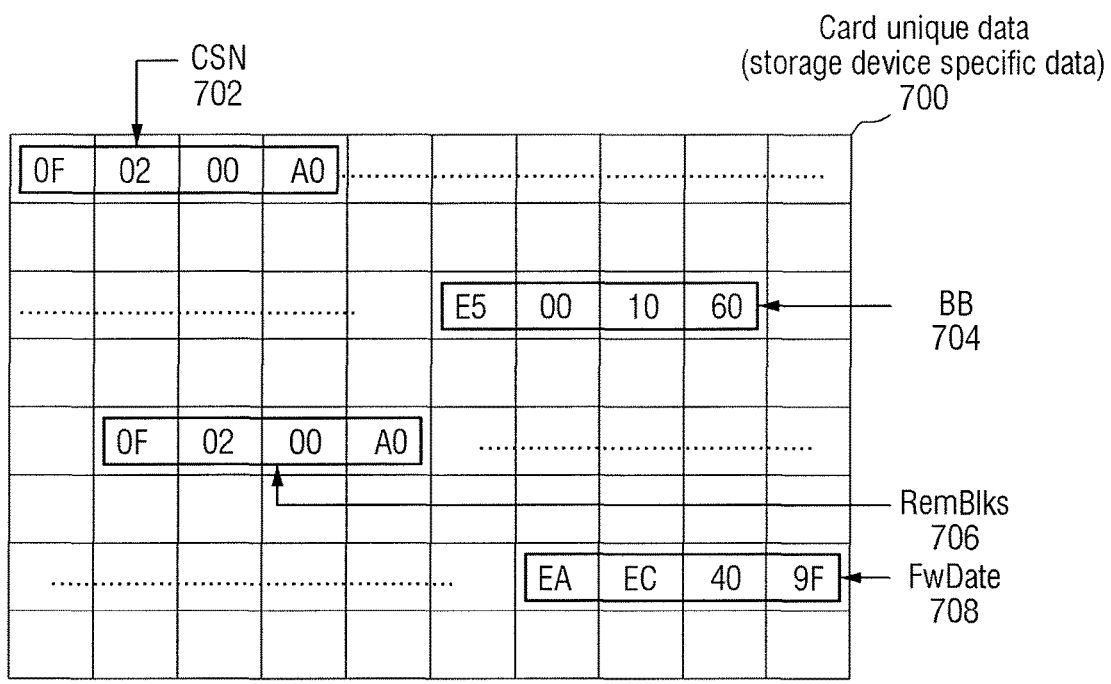
FIG. 7 illustrates an example of device unique data.

FIG. 7 illustrates an example of device unique data 700 shared by the storage device 104 with the host device 102 for the authentication of the storage device 104. The device unique data 700 includes one or more parameters or identifiers such as a Card Serial Number (CSN) 702, Bad Blocks information (BB) 704, Remaining Valid Blocks (RemBlks) 706, or a Firmware release date (FwDate) 708. All these parameters or identifiers or any other ones specific to a particular storage device may used, as long as there is no or only a small chance of being similar to another storage device.

Figure 8:
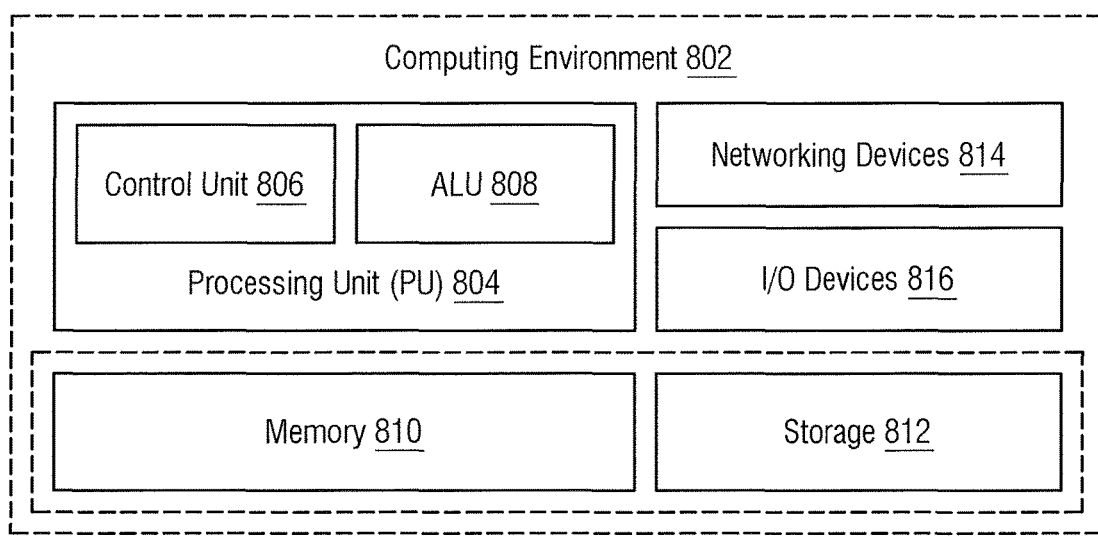
FIG. 8 illustrates an embodiment of a computing environment.

FIG. 8 illustrates an embodiment of a computing environment 802 implementing one or more of the embodiments of the method for authenticating a storage device. The computing environment 802 includes at least one processing unit 804 equipped with a control unit 806 and an Arithmetic Logic Unit (ALU) 808, a memory 810, a storage unit 812, plurality of networking devices 814, and a plurality Input output (I/O) devices 816. The processing unit 804 may process instructions of the algorithm. The processing unit 804 may receive commands from the control unit 806 to perform processing. Any logical and/or arithmetic operations involved in the execution of the instructions may be computed, for example, with the help of the ALU 808.

The overall computing environment 802 may be composed of multiple homogeneous and/or heterogeneous cores, multiple CPUs of different kinds, special media, and other accelerators. The processing unit 804 may be responsible for processing the instructions of the algorithm. Further, the plurality of processing units 804 may be located on a single chip or over multiple chips.

The algorithm includes instructions and codes stored in the memory unit 810 or the storage 812, or both. At the time of execution, the instructions may be fetched from the corresponding memory 810 and/or storage 812 and executed by the processing unit 804. For hardware implementations, various networking devices 814 or external I/O devices 816 may be connected to the computing environment to support the implementation through the networking unit and the I/O device unit.

The embodiments disclosed herein may be implemented through at least one software program running on at least one hardware device and performing network management functions to control the network elements. The network elements in FIG. 1 through FIG. 8 include blocks which may be at least one of a hardware device, or a combination of hardware device and software module.

In accordance with another embodiment, an apparatus including a memory for storing instructions to be executed by a processor, the instructions including: first code to send dynamic information to a storage device; second code to receive information from the storage device based on the dynamic information; and third code to authenticate the storage device based on the received information, the first code to change the dynamic information for different authentication sessions of the storage device. The first code may generate the dynamic information by: generating, a random seed index corresponding to a random seed table, the random seed index corresponding to a current authentication session; and obtaining the dynamic information by randomizing data based on a first seed from the random seed table, the data including the random seed index, a start signature, and an end signature. The third code may authenticate the storage device based on device unique data including at least one parameter corresponding to the storage device. The at least one parameter may include at least one of serial number information, bad blocks information, remaining valid blocks information, or a release date information. The dynamic information may be encrypted.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

The processors, controllers, encryptors, decryptors, devices modules, or other processing features of the embodiments disclosed herein may be implemented in logic which, for example, may include hardware, software, or both. When implemented at least partially in hardware, the processors, controllers, encryptors, decryptors, devices modules, or other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, controllers, encryptors, decryptors, devices modules, or other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein. The term "device unit data" may be or include card unique data or other type of unique device-specific data.

Example embodiments have been disclosed herein, and although specific terms are employed, they are used and are to be interpreted in a generic and descriptive sense only and not for purpose of limitation. In some instances, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims. The embodiments (or portions thereof) may be combined to form additional embodiments.

What is claimed is:

1. A method for authenticating a storage device, the method comprising:
   sending, by an authentication module of a host device, encrypted host device data to the storage device for a current authentication session;
   receiving, by the authentication module, encrypted storage device specific data and an encrypted first output string from the storage device based on the encrypted host device data sent to the storage device; and
   authenticating, by the authentication module, the storage device based on the encrypted storage device specific data and the encrypted first output string from the storage device, wherein
   the encrypted host device data is obtained by:
   generating a random seed index corresponding to a random seed table, wherein the random seed index is for the current authentication session, and the random seed table is in the host device and the storage device; and
   obtaining the encrypted host device data by randomizing host device data based on a first seed from the random seed table, wherein the host device data includes the random seed index, a start signature, and an end signature.

2. The method as claimed in claim 1, wherein authenticating the storage device based on the encrypted storage device specific data and the encrypted first output string includes:
   decrypting the encrypted storage device specific data based on a second seed of the random seed table to obtain storage device specific data, wherein the second seed is located by the random seed index shared with the storage device in the encrypted host device data and the storage device specific data is device unique data including at least one parameter;
   generating a second output string at the host device as a function of the at least one parameter of the device unique data;
   decrypting the encrypted first output string to obtain a first output string based on a key, wherein the key is derived based on the at least one parameter of the device unique data and the random seed table; and
   authenticating the storage device when the second output string matches with the first output string.

3. The method as claimed in claim 1, wherein the encrypted storage device specific data and the first encrypted output string from the storage device is obtained by the storage device by:
   decrypting, using the first seed of the random seed table, the encrypted host device data to generate host device data including the random seed index of the random seed table, the start signature and the end signature, wherein the random seed index in the host device data is for the current authentication session and the random seed table is present in the host device and the storage device;
   encrypting storage device specific data to generate the encrypted storage device specific data, wherein the storage device specific data is encrypted based on a second seed of the random seed table, wherein the second seed is located based on the random seed index from the host device data and the storage device specific data is device unique data including at least one parameter;
   encrypting an output string to generate the first encrypted output string using a key, wherein the key is derived based on the at least one parameter of the device unique data and the random seed table, wherein the output string is a function of the at least one parameter of the device unique data; and
   sending the encrypted storage device specific data and the encrypted output string to the host device for authentication of the storage device by the host device.

4. A host device, comprising:
   a processor;
   a memory;
   an authentication module in the memory, the authentication module to:
   send encrypted host device data to a storage device for a current authentication session;
   receive encrypted storage device specific data and an encrypted first output string from the storage device based on the encrypted host device data sent to the storage device; and
   authenticate the storage device based on the encrypted storage device specific data and the encrypted first output string from the storage device, wherein
   the authentication module is to obtain the encrypted host device data by:
   generating a random seed index corresponding to a random seed table, wherein the random seed index is for the current authentication session and the random seed table is in the host device and the storage device; and
   obtaining the encrypted host device data by randomizing a host device data using a first seed from the random seed table, wherein the host device data includes the random seed index, a start signature, and an end signature.

5. The host device as claimed in claim 4, wherein the authentication module is to authenticate the storage device based on the encrypted storage device specific data and the encrypted first output string by:
- decrypting the encrypted storage device specific data using a second seed of the random seed table to obtain storage device specific data, wherein the second seed is located by the random seed index shared with the storage device in the encrypted host device data and the storage device specific data is a device unique data including at least one parameter;
- generating a second output string at the host device as a function of the at least one parameter of the device unique data;
- decrypting the encrypted first output string to obtain a first output string based on a key, wherein the key is derived based on the at least one parameter of the device unique data and the random seed table; and
- authenticating the storage device, when the second output string matches with the first output string.

6. A storage device, comprising:
- a processor;
- a memory;
- an authentication module in the memory, the authentication module to:
- receive encrypted host device data from a host device for a current authentication session; and
- send encrypted storage device specific data and an encrypted output string to the host device in response to the encrypted host device data from the host device, wherein the authentication module is to send the encrypted storage device specific data and the encrypted output string by:
- decrypting, based on a first seed of a random seed table, the encrypted host device data to generate host device data including a random seed index of the random seed table, a start signature and an end signature, wherein the random seed index in the host device data is for the current authentication session and the random seed table is in the host device and the storage device;
- encrypting storage device specific data to generate the encrypted storage device specific data, wherein the storage device specific data is encrypted using a second seed of the random seed table, wherein the second seed is located using the random seed index from the host device data and the storage device specific data is device unique data including at least one parameter;
- encrypting an output string to generate the encrypted output string based on a key, wherein the key is derived based on the at least one parameter of the device unique data and the random seed table, wherein the output string is a function of the at least one parameter of the device unique data; and
- sending the encrypted storage device specific data and the encrypted output string to the host device for authentication of the storage device by the host device.

* * * * *